United States Patent [19]

Theimer

[11] 4,027,139
[45] May 31, 1977

[54] DEVICE FOR GRILLING AND BROILING FOOD

[75] Inventor: Hubert Theimer, Nurtingen, Germany

[73] Assignee: Stumpp & Schule KG, Beuren, Germany

[22] Filed: Feb. 27, 1976

[21] Appl. No.: 662,229

[30] Foreign Application Priority Data

Feb. 28, 1975 Germany ............................ 2508729

[52] U.S. Cl. ............................ 219/525; 99/372; 99/422; 219/462; 219/464; 219/530
[51] Int. Cl.² ........................................ H05B 3/06
[58] Field of Search .......... 219/462, 464, 524, 525, 219/530; 99/8, 372, 374, 375, 378, 379, 380, 381, 422

[56] References Cited

UNITED STATES PATENTS

| | | | |
|---|---|---|---|
| 2,478,529 | 8/1949 | Farr et al. | 219/524 |
| 2,710,906 | 6/1955 | Lipsich et al. | 219/525 X |
| 2,881,299 | 4/1959 | Jepson | 219/524 X |
| 2,895,407 | 7/1959 | Gomersall | 99/379 |
| 3,377,942 | 4/1968 | Carson | 99/375 |
| 3,848,110 | 11/1974 | Giguere et al. | 219/525 |
| 3,938,431 | 2/1976 | Potvin | 219/525 X |

Primary Examiner—Volodymyr Y. Mayewsky
Attorney, Agent, or Firm—Edwin E. Greigg

[57] ABSTRACT

Device for grilling and broiling food comprising an electrically heated lower plate member adjacent to one end of which is provided an upstanding turret element on which an upper plate member, also electrically heated, is pivotally and adjustably supported so as to perform the cooking operation without, as a consequence exerting any pressure on the food product. Further modified embodiments disclosed herein reveal various concepts for supporting the upper plate member in an adjustable manner.

4 Claims, 11 Drawing Figures

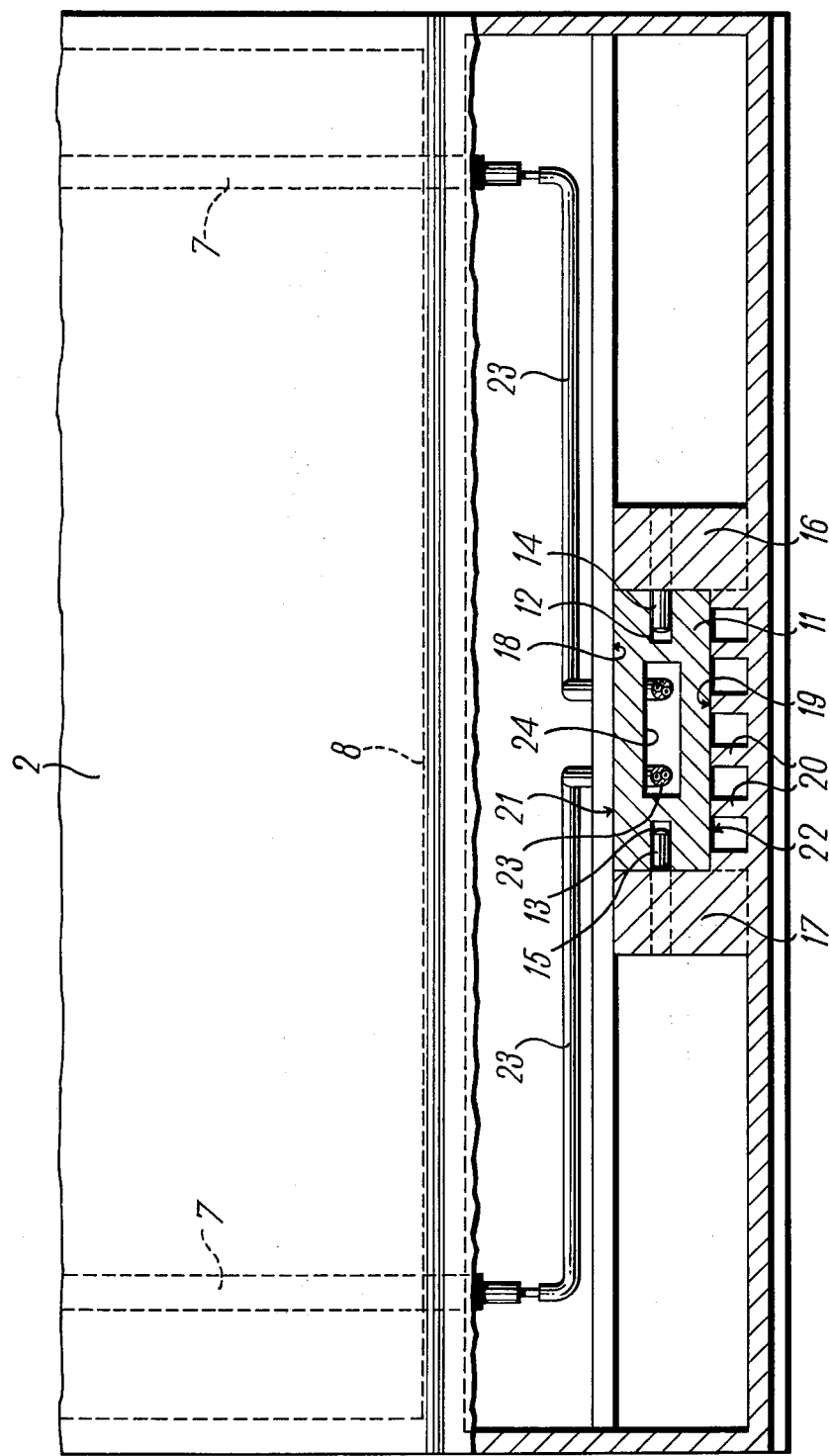

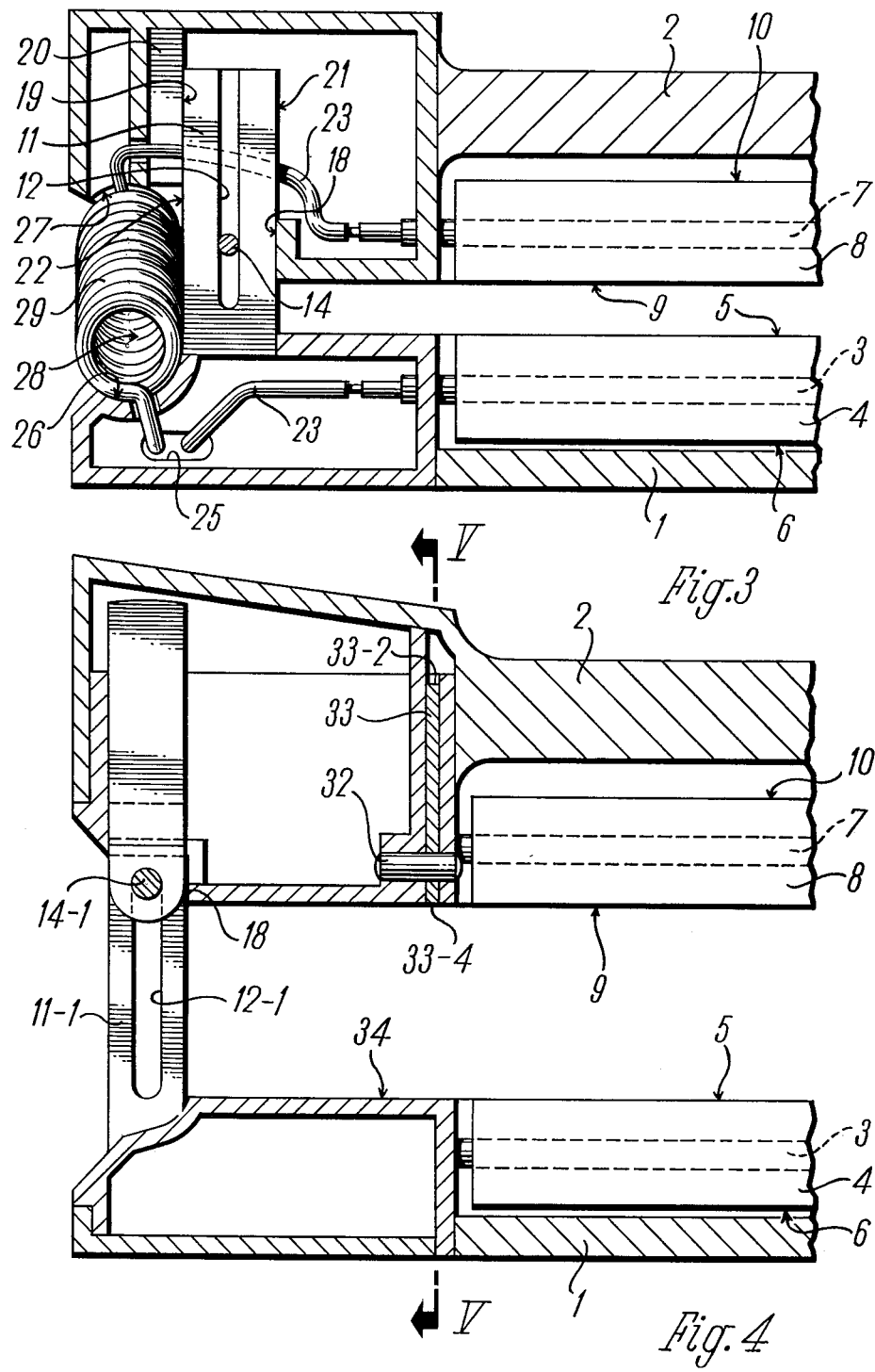

DEVICE FOR GRILLING AND BROILING FOOD

BACKGROUND OF THE INVENTION

The present invention relates to a device for grilling and broiling food which comprises correlated upper and lower plates capable of being heated, with the upper plate being disposed in a vertically adjustable pivoting relationship with respect to the lower plate.

Devices of this type are known. The object of the present invention is to so improve a device of this type that the upper part can be positioned at a desired distance from the lower part, so that it does not rest with its full weight on the food placed between the upper and lower parts but can be arranged at a specific distance therefrom.

This is solved according to the invention by the features indicated in the characterizing part of claim 1.

The engagement of the guide pins provided in the upper part, in the grooves in the supporting and guide parts, insures perfect guidance during upward and downward displacement of the upper part with respect to the lower part, and also acts an an axis of rotation when the upper part is pivoted upwards. The stop faces enable the weight of the upper part, acting on them in the form of a pressing force, to keep the upper part in any particular position or level to which it may be adjusted with respect to the lower part.

A plurality of particularly advantageous embodiments of this form of mutual blocking action realized by means of the pressing force of the aforesaid stop faces which are urged against one-another, as a result of the weight of the upper part, are defined in the subclaims.

OBJECT AND SUMMARY OF THE INVENTION

Accordingly, an important advantage of the present invention is that the electric lines for supplying power to the heating plate in the upper part can be guided upwards inside the guide and support part. This eliminates any type of bulky loop or the like, electrically connecting the upper and lower parts. An alternative to this consists in providing recesses on the back of both the upper and lower parts of the device; these recesses being designed to hold an obliquely disposed cable guiding these electrical lines.

Further advantageous features of the invention are defined in the remaining subclaims.

The invention will be better understood as well as further objects and advantages thereof become more apparent from the following detailed description of an exemplary embodiment taken in conjunction with the drawing,

BRIEF DESCRIPTION OF THE DRAWING

FIG. 2 is a sectional view along line II—II of FIG. 1;

FIG. 3 is a diagrammatic view of a second embodiment of the invention;

FIG. 4 is a diagrammatic view of a third embodiment of the invention;

DESCRIPTION OF THE PREFERRED EMBODIMENTS

Figure 1:
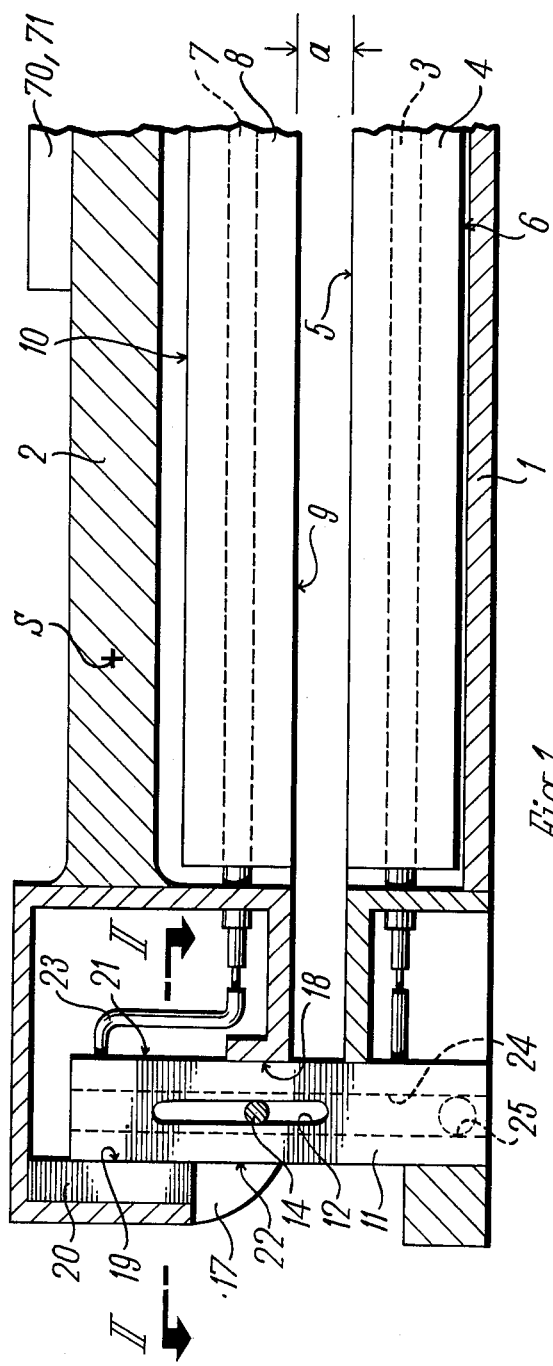
FIG. 1 is a diagrammatic view of a first embodiment of the invention.

Turning now to the drawings, the first embodiment of the invention represented in FIGS. 1 and 2, comprises a lower part 1 and an upper part 2. A hearing rod 3, above which a heatable plate 4 can be inserted in two positions, is provided in the lower part 1. The upper part 2 also comprises a heating rod 7 above which a heatable plate 8 (see FIG. 2) can also be inserted in two positions. In one position, the side faces 5, 9 are disposed opposite one another and in the other position, the side faces 6, 10 are disposed opposite one another. The aforementioned faces thereby form the grilling or broiling chamber. The side faces 5, 9 or 6, 10, are designed for different broiling and grilling processes e.g. the side faces 5, 9 comprising a waffle pattern for cooking waffles, and the side faces 6, 10 comprise ribbed-like surfaces for grilling meats.

An upstanding turret 11, 2 which acts as a guide and supporting part, is provided in the lower part 1. The turret is arranged to extend vertically upward from the left side of the lower part 1 as shown. The turret 11, is provided on its oppositely disposed surfaces with vertically extending grooves 12 and 13, in which the guide pins 14 and 15 are adapted to engage. The guide pins 14 and 15 are disposed in two bosses 16 and 17, which are associated with the upper part 2, and between which the turret 11 extends. The engagement of the guide pins 14 and 15, in the grooves 12 and 13 enables the upper part to be vertically guided in the turret 11 relative to the lower part 1, thus providing vertical guidance and adjustment of the upper part 2, with respect to the lower part. The fixing of the upper part 2 in a specific vertical position (see a of FIG. 1) relative to the lower part, is so achieved in that the point of gravity S, of the entire upper part 2, is disposed to the right of the groove 12, and thus when the upper part is released in any particular position (a), a torque about the axis of rotation of the guide pins 14 and 15 is produced. As a result, the perpendicular surface 18 on the upper part 2 exerts a pressing force on the front surface 21 of the turret 11, and the rear surface 19 of the ribs in the upper part 2 on the rear surface 22 of the turret 11. A "tilting" action thus takes place. The frictional force produced between the respective surfaces in a vertical direction, by the pressure of the surface 18 on the front surface 21, or of the rear surface 19 on the rear surface 22 is sufficient to prevent the upper part 2 from sliding down the turret.

By virtue of the fact that the upper part 2 can be fixed in a specific but selectable and adjustable position (a) above the lower part 1, it is possible to heat the upper side of a piece of food between the plates 4, and 8 without the upper part resting with its full weight on the food to be cooked.

As described above, tilting is produced by pressure between the surface 18, and the surface 21, and between the rear surface 19 of the ribs 20 and the rear surface 22. If the mutual pressing action on these points is eliminated, the upper part still remains fixed in position as the guide pins 14 and 15 are then pressed against a side wall of the grooves 12 and 13, so that this contact point then assumes the function of the second contact point required for the canting action. The relative position of the guide pins 14 and 15 with respect to the other contact point, determines whether they press against the left or right side (in FIG. 1) of the grooves 12 and 13.

The electric conduits 23 for supplying current to the heating rod 7 in the upper part 2 are guided in a chamber 24 provided in the turret 11. They are introduced into the chamber 24 in the lower part 1, through the opening 25. The cumbersome connection of conventional devices involving a loop or the like, which was longer than the dimensions of the upper and lower parts, and which had to be specially protected, is eliminated in the case of the device according to this invention.

The turret 11, is advantageously made of an extruded hollow metal section, comprising lateral grooves as shown. If the turret is made of a plastic material, it is advisable to provide metal reinforcing panels on both sides of the grooves to prevent deflection by such a construction.

The upper part 2 can be pivoted upwards towards the left in counter-clockwise direction about the axis of rotation of the guide pins 14 and 15, to place the food on the grill.

FIG. 3 represents another embodiment of this invention. In this embodiment confronting recesses 26 and 27 are in the upper part 2 and the lower part 1 at the left end of the device adjacent to the turret 11. As illustrated, the cable 29 is wound into the form 28 with the terminal ends of the cable being connected to the heating rods 3 and 7, respectively. The cable 29, extends from the bottom front part to the top rear, i.e., viewed from the rear of the device (from the left in FIG. 3), it is obliquely disposed in the form shown. This saves considerable space. It also insures that when the device is opened by pivoting up the upper part 2, the cable 29 only changes its position slightly and can thus be expected to be confined between the recesses 26 and 27 when the device is opened. The cable is protected in this manner and does not represent a cumbersome obstruction. For these reasons, it does not constitute an undesirable enlargement of the device.

Figure 1A:
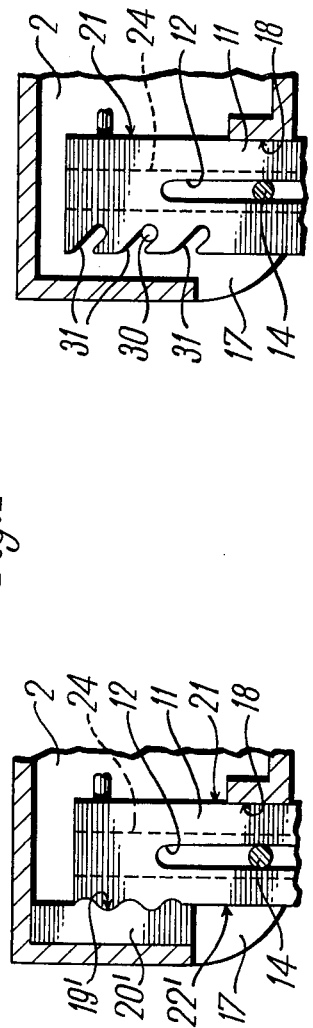
FIG. 1a is a fragmentary view of a first modification of some of the elements shown in the embodiments according to FIG. 1.

In the embodiments according to FIGS. 1, 2, and 3, the upper part is positioned in a specific position (a), by tilting the upper part 2 and the turret 11. This can be modified by providing the surfaces, which come into contact with one another in the course of the tilting action with a corrugation which further facilitates the operation of securing the upper part in position. This modification of the embodiment according to FIGS. 1 and 2 is represented in FIG. 1a. The rear surfaces 19 of the ribs 20 — and the complemental surfaces 22 of the turret 11 have an undulatory cross-section as shown.

Figure 1B:
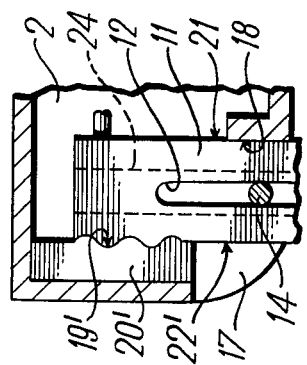
FIG. 1b is another fragmentary view of a second modification of some of the elements shown in the first embodiment according to FIG. 1.

A further modification of the embodiment according to FIG. 1 is represented in FIG. 1b. The upper part 2 comprises a series of vertically disposed slots 31 in which a rod 30 that is rigidly attached to the upper part 2, can be engaged at different levels.

Figure 5:
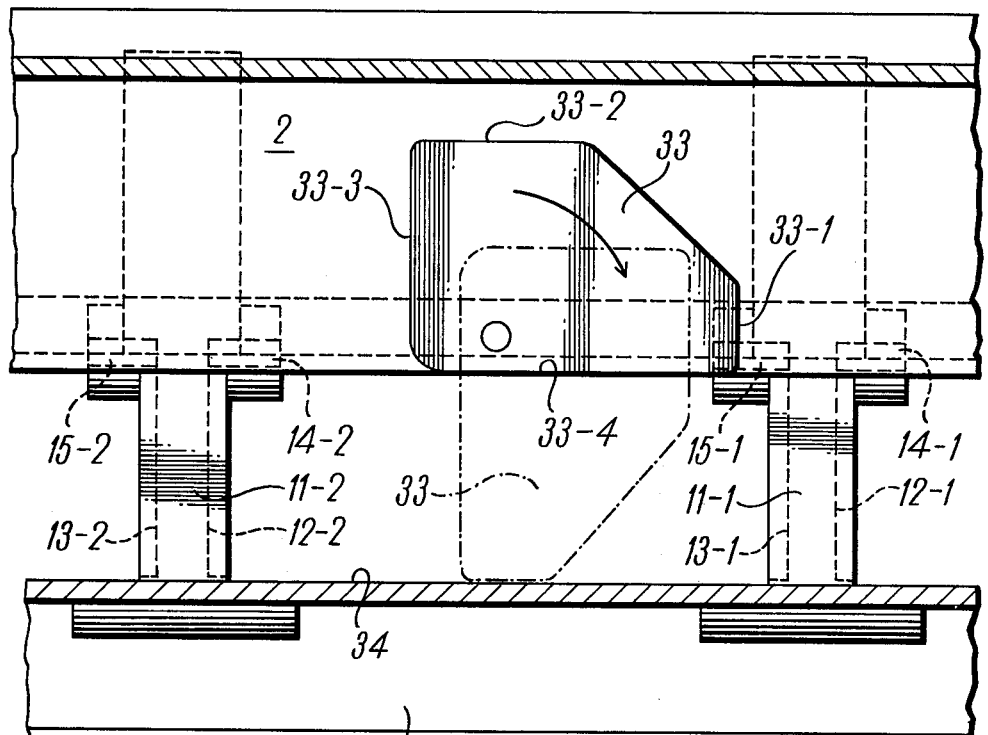
FIG. 5 is a sectional view along line V—V of FIG. 4.

The embodiment accordng to FIGS. 4 and 5 discloses another method of securing the upper part in position. This embodiment comprises two turrets 11-1, and 11-2, with each of said turrets including diametrically opposed grooves 12-1, 12-2, and 13-1, 13-2, on their side portions and into which the guide pins 14-1, 14-2, and 15-1, 15-2, which are attached to the upper part 2, are adapted to engage. A supporting plate 33 rotatable about a pin 32 is provided on the upper part 2 to support the same in a specific pre-selected vertical position. The supporting element 33 comprises an irregular trapezoid having different supporting surfaces 33-1, 33-2, 33-3, 33-4, which are all spaced at different distances from the axis of rotation of the pin 32. Thus a specific distance between the lower part 1 and the upper part 2 is maintained as a function of the rotational position of the supporting plate 33. In the one position represented by the unbroken lines, the supporting plate 33 is fully "pivoted inwards", and the supporting surface 33-4, facing towards the lower part 1 does not project below the lower limit of the upper part 2. Thus, the upper part 2 can be fully lowered on the lower part 1. In the position represented by the perforated lines, the supporting surface 33-1 is supported on the face 34 of the lower part 1, thus producing a space between the upper part 2 and the lower part 1.

Figure 6:
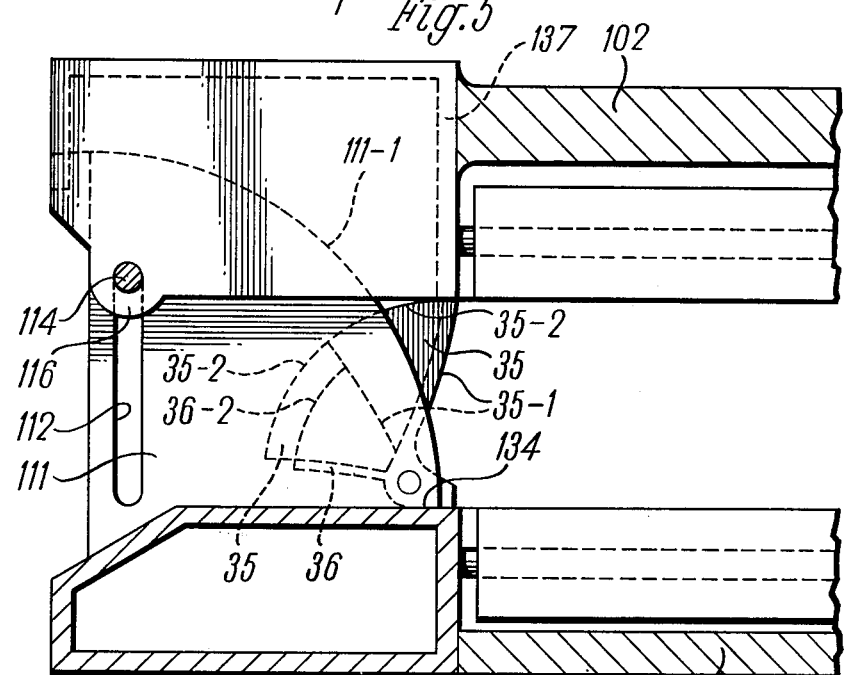
FIG. 6 is a diagrammatic view of a fourth embodiment of the invention.
Figure 7:
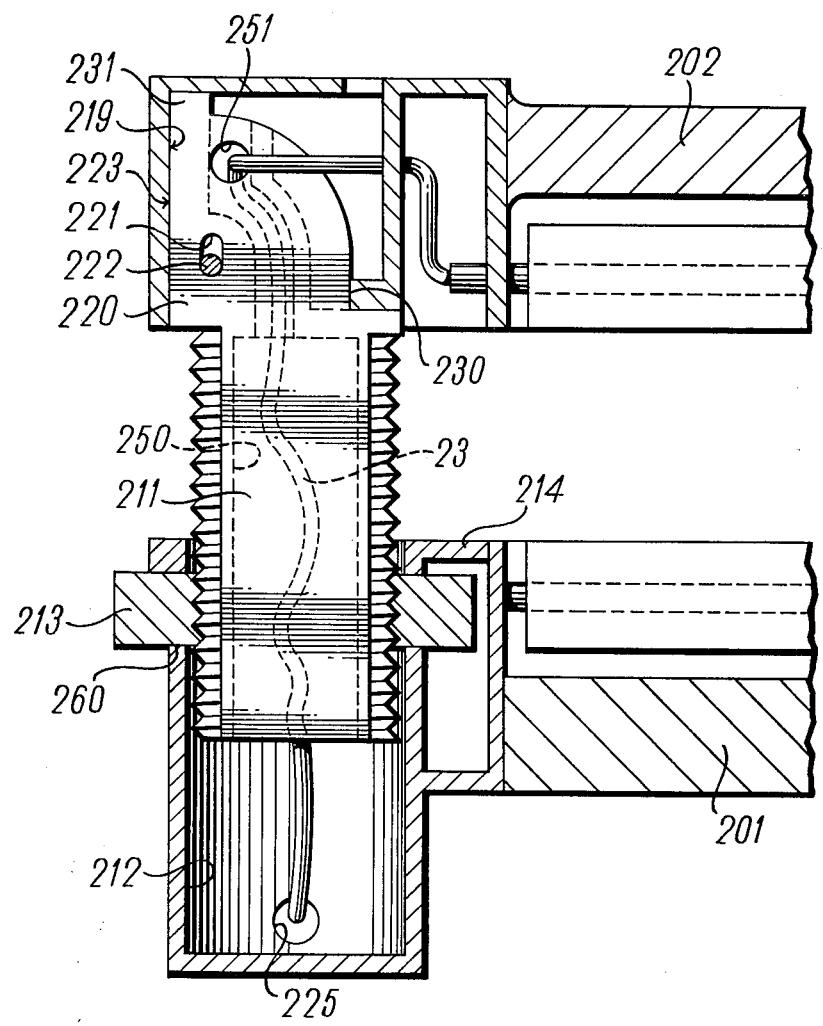
FIG. 7 is a diagrammatic view of a fifth embodiment of the invention.
Figure 7A:
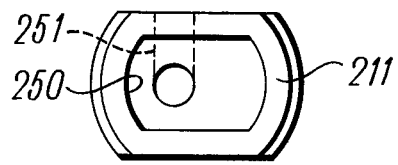
FIG. 7a is a cross section through the turret in the embodiment according to FIG. 7.

FIG. 6 represents another concept of fixing the vertical position of the upper part relative to the lower part. The cross section of the turret 111, represented in FIG. 6, is in the form of a quarter circle and it also includes lateral grooves, of which groove 112 is visible. One of two guide pins, namely guide pin 114, which is secured to the upper part 102, engages in this groove 112. Various supporting keys are provided in the turret 111. To simplify the drawings, only two such keys 35, and 36 are represented in FIG. 6. The unbroken lines represent the supporting key 35 in the outwardly pivoted state and the perforated lines in the inwardly pivoted state. The suporting key 36 is represented by the perforated lines in the inwardly pivoted state. The supporting key 35 comprised a side surface 35-1, which, in the inwardly pivoted state (represented by the perforated lines) is completely contained within the side face 111-1 of the turret 111. In this state it does not block the path of the transverse rib 137, provided on the upper part 102, such that the upper part 102 can be fully lowered onto the surface 134 on the lower part 1. In the outwardly pivoted state (unbroken lines), the side face 35-1 blocks the path of transverse rib 137, such that the latter rests on it. Thus, the distance between the upper part 102 and the lower part 101 is determined by the height of the side surfaces 35-2 of the supporting key 35, or the side surface 36-2 of the supporting key 26. FIG. 7 represents still another concept of securing the upper part in a vertical position with respect to the lower part. The turret 211, is in the form of a support comprising outer thread. However, this support does not comprise a circular cross section, but rather a laterally flattened cross section, such as that in FIG. 7a. The turret is received in a blind hole 212 having a corrresponding cross section, in the lower part 201 of the device. An adjusting nut 213, the underside of which rests on the upper end surface 260 of the blind hole 212, is disposed on the outer thread of the turret 211. The turret 211 is inserted to varying depths in the blind hole 212 depending on the position which the adjusting nut 213 occupies on the outer thread of the turret 211. A covering disk 214 is arranged over the adjusting nut 213 in the lower part 211. At its upper end, the turret 211 provides a supporting part 220 comprising a longitudinal opening 221. A guide pin 222, which is rigidly connected to the upper part 202 is guided in this longitudinal opening. When the device is closed, the horizontally disposed upper part 202 is supported by the surface 219 of the part 201, resting on the side surface 223 of the supporting part 220. The pivoting movement of the upper part 202 in a counter-clockwise direction is determined by the stop 230 on the supporting part 220. The longitudinal opening 221 also permits a certain amount of additional height compensation with a specific adjustment of the adjusting nut 213, for example, when placing the heatable plate in the upper part on certain extremely high points of the food, a steak, etc. The electric conduit is guided from the opening 225 of the lower end through the blind hole 212 into the upper part 202 via an inner bore 250 in the turret 211. The electric cable leaves the supporting part 220 via the opening 251 and extends to the upper heating rod 7.

Figure 8:
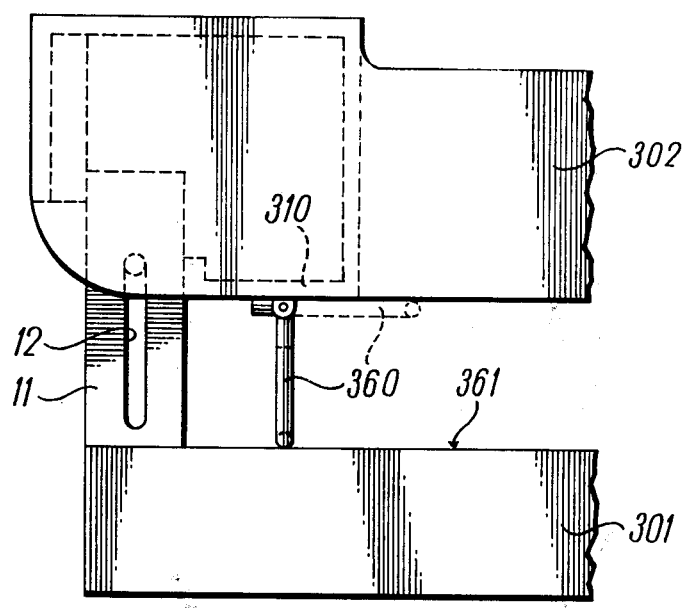
FIG. 8 is a diagrammatic view of a fifth embodiment of the invention.

FIG. 8 represents still another concept of supporting the upper part with respect to the lower part. A yoke 360, which can be displaced from the position represented by the perforated lines, into the position represented by the unbroken lines in which its lower ends rests on the surface 361 of the lower part 301 is provided on the underside of the plate 310 which terminates the upper part 302 at its lower part. By providing a plurality of yokes of different lengths, which can be pivoted down as desired, it is possible to secure the upper part 302 at different levels above the lower part 301.

The turret can also comprise a column, having a circular cross section which can be fixed in a specific vertical position by tilting a bore in the upper part, through which the column is guided; this column also being laterally pivotable to allow the food to be placed in position.

As represented in the embodiment according to FIGS. 1 and 2, it is possible to mount two positioning blocks or elevating elements 70 and 71, on the upper part 2, if it is vertically adjustable. The device can thus be turned upside down, so that it may rest on the upper part and the part previously referred to as the lower part, can then be pivoted upward. The positioning blocks need not be provided if the upper limiting face of the upper part in FIG. 1 is as shown in that view.

What is claimed is:

1. A device for grilling and broiling food comprising upper and lower plate members, a heatable plate with grilling surfaces attached to each of said plate members and heating means for heating each of said heatable plates, said upper plate member being capable of vertical and pivotal adjustment relative to the lower plate member, said lower plate member further including at least one upright turret member having upwardly extending elongated slot means and at least one stop surface zone, said upper plate member having pin means for cooperating with said slot means in said turret member, and abutment means for abutment on said stop surface zone of said turret member, to thereby permit pivotal movement of the upper plate member with respect to the lower plate member by cooperation of the pin means with the slot means and further to thereby permit vertical adjustment by cooperation of the abutment means and said stop surface zone.

2. A device as claimed in claim 1 in which the stop surface zone is formed by a key member mounted to move between first and second positions, wherein, in the first position, the key member is retracted from the path of travel of said abutment means, and in the second position, the key member is positioned in the path of travel of said abutment means and thereby contacts said abutment means to provide a desired vertical adjustment of the upper plate member.

3. A device as claimed in claim 2, in which there are provided a plurality of stop surface zones each being formed by a key member mounted to move between first and second positions.

4. A device as claimed in claim 1 in which the heating means is an electrical heating rod.

* * * * *